US009488131B2

(12) United States Patent
Bulin et al.

(10) Patent No.: US 9,488,131 B2
(45) Date of Patent: Nov. 8, 2016

(54) DEVICE FOR CONTROLLING A VARIABLE SECTION NOZZLE OF AN AIRCRAFT

(71) Applicant: AIRBUS OPERATIONS (S.A.S), Toulouse (FR)

(72) Inventors: Guillaume Bulin, Blagnac (FR); Patrick Oberle, Verdun sur Garonne (FR); Nicolas Devienne, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 656 days.

(21) Appl. No.: 13/864,553

(22) Filed: Apr. 17, 2013

(65) Prior Publication Data
US 2013/0269312 A1 Oct. 17, 2013

(30) Foreign Application Priority Data

Apr. 17, 2012 (FR) ...................... 12 53503

(51) Int. Cl.
| F02K 3/06 | (2006.01) |
| F02K 1/15 | (2006.01) |
| F02K 1/16 | (2006.01) |
| F02K 1/17 | (2006.01) |
| F02K 3/075 | (2006.01) |
| F02C 9/48 | (2006.01) |
| F02K 1/09 | (2006.01) |

(52) U.S. Cl.
CPC . *F02K 3/06* (2013.01); *F02C 9/48* (2013.01); *F02K 1/09* (2013.01); *F02K 1/15* (2013.01); *F02K 1/16* (2013.01); *F02K 1/17* (2013.01); *F02K 3/075* (2013.01); *F05B 2270/1031* (2013.01); *Y02T 50/671* (2013.01)

(58) Field of Classification Search
CPC ............ F02K 3/075; F02K 3/06; F02K 1/76; F02K 1/763; F02K 1/766; Y02T 50/671
See application file for complete search history.

(56) References Cited

U.S. PATENT DOCUMENTS

| 3,797,785 | A | 3/1974 | Baerresen |
| 5,826,823 | A | 10/1998 | Lymons |
| 8,601,789 | B2 * | 12/2013 | Le Coq ................... F02K 1/16 60/226.1 |
| 2004/0118974 | A1 | 6/2004 | Colotte |
| 2008/0190095 | A1 * | 8/2008 | Baran ................... F02K 1/002 60/226.3 |
| 2011/0017843 | A1 | 1/2011 | Le Coq |
| 2013/0008145 | A1 * | 1/2013 | Sundstrom .............. F02K 1/12 60/226.2 |
| 2013/0292489 | A1 * | 11/2013 | Vauchel ................... F02K 1/09 239/265.19 |

FOREIGN PATENT DOCUMENTS

| EP | 0 779 429 | 6/1997 |
| EP | 1 413 735 | 4/2004 |
| EP | 1 978 231 | 10/2008 |
| FR | 2 928 681 | 9/2009 |
| GB | 588502 | 5/1947 |

OTHER PUBLICATIONS

French Search Report dated Feb. 18, 2013.

* cited by examiner

*Primary Examiner* — Craig Kim
(74) *Attorney, Agent, or Firm* — Dickinson Wright PLLC

(57) ABSTRACT

A control device for controlling a variable section nozzle of an aircraft power plant, the variable section nozzle including one or several movable parts capable of modifying the nozzle section and connected by a mechanical transmission chain to an actuator. The control device includes a system for regulating the power plant connected to a control member configured to control the actuator. The control device includes a single control member, an immobilization unit configured to immobilize all the movable parts which are deactivated only when the regulation system controls the positional change of the movable part or parts and a determination unit configured to determine the actual position of the movable part or parts.

8 Claims, 3 Drawing Sheets

DEVICE FOR CONTROLLING A VARIABLE SECTION NOZZLE OF AN AIRCRAFT

CROSS REFERENCE TO RELATED APPLICATION

This application is entitled to and claims the benefit of French Application No. FR 12 53503 filed Apr. 17, 2012, the disclosure of which including the specification, claims, drawings and abstract is incorporated herein by reference in its entirety.

FIELD

The present invention relates to a device for controlling a variable section nozzle of an aircraft.

RELATED ART

To reduce fuel consumption, certain aircraft are provided with a power plant with a variable section nozzle. Therefore, it is possible to adapt the flow passing through the nozzle, by modifying its section, to external conditions and to the running speed of the motor in order to optimize the yield of the power plant.

According to an embodiment shown in FIG. 1, an aircraft propulsion system comprises a nacelle 10 in which is arranged, in a substantially concentric manner, a power plant 12 connected by means of a strut to the remainder of the aircraft.

The nacelle 10 comprises an inner wall defining a conduit 14 with an air intake 16 at the front, a first portion of the incoming air flow, referred to as a primary flow, flowing through the power plant 12 to participate to the combustion, the second portion of the air flow, referred to as a secondary flow, being driven by a fan 18 and flowing into an annular conduit 20 defined by the inner wall of the nacelle and the outer wall of the power plant. At the rear, the primary flow escapes via a stationary nozzle 22 with a truncated portion whose diameter decreases along the flow direction of the flows. The secondary flow escapes via an outlet 24 defined inside by the stationary nozzle 22 and outside by a movable nozzle 26 corresponding to the variable section nozzle 26 provided at the rear end of the nacelle.

According to an embodiment, the variable section nozzle 26 can move in translation along a displacement direction parallel to the longitudinal direction of the motor (corresponding to the axis of the motor having the reference 28) between two end positions corresponding to a first front position shown in solid line in FIG. 1 and a rear position shown in broken lines in FIG. 1. Insofar as the stationary nozzle has a truncated shape, it is possible to control the outlet section of the variable section nozzle by adjusting the position of the latter along the displacement direction.

According to an embodiment shown in FIG. 2, the variable section nozzle 26 comprises movable parts 30 which move due to a mechanical transmission chain 32 driven by a motor 34. The mechanical transmission chain 32 makes it possible to transform the rotational movement of the outlet shaft of the motor 34 into a translational movement along the displacement direction of the movable parts.

The invention more particularly relates to a variable section nozzle which is not subjected to frost accretion, such as, for example, described in document U.S. Pat. No. 3,797,785.

FIG. 2 shows a device for controlling a variable section nozzle according to the prior art.

To control the position of the movable parts, the control channel comprises a system 42 for regulating the power plant referred to as FADEC (Full Authority Digital Motor Control), and a control member 44 referred to as PE (Power Electronics) for controlling the motor 34.

Therefore, when the regulation system 42 transmits a signal to the control member 44, the latter triggers a rotation of the motor 34 which, by means of the mechanical transmission chain 32, generates the translation of the movable parts 30. The control member 44 fulfills, among other things, the function of power converter between a control circuit upstream and a power circuit downstream.

To meet the requirements set by the certifying authorities, the control device uses redundant means to improve steering reliability for want of improving the reliability of the components themselves.

Therefore, the control device comprises two motors 34 and 34', each of them being capable of triggering the movement of all the movable parts 30, two control members 44 and 44', one for each motor, and two supplies 46 and 46' to supply the control members and associated motors with electric energy.

To ensure the transmission of the signals between the control members and the regulation system 42 while respecting segregation constraints, four series of cables are provided, two for each control member 44, 44'.

This solution makes it possible to respect the constraints imposed by the certifying authorities.

If a control member is defective, the other can ensure the control of the motors and thus the control of the position between movable parts of the variable section nozzle.

If a supply is defective, the second supply can replace it.

For each control member, if a series of cables is defective, the communications between the regulation system and the control member can be performed by the second series of cables.

Finally, if a motor is defective, the movement of the movable parts of the movable section nozzle can be performed by the second motor.

Even if it is satisfactory in terms of safety and reliability, this control device is not entirely satisfactory because of the duplication of certain elements which causes the onboard mass to be increased and the operating and integration to become more complex.

An alternative could consist of having a simple-type architecture comprising only one control member for each variable section nozzle. However, this architecture does not make it possible to meet today's norms in terms of reliability of the control of the thrust of the power plant.

In the field of variable section nozzles, document GB-588.502 is known. This document describes a variable section nozzle with movable parts whose movement is controlled by a transmission chain which comprises a motor, a rod connected to the motor, a cable connected to the movable parts, and a mechanism for coupling/uncoupling the rod and the cable. This mechanism is controlled by a solenoid. When the solenoid is deactivated, the mechanism ensures the coupling of the rod and of the cable, which means that the movable parts move as a function of the rotation of the motor. When the solenoid is activated, the mechanism no longer ensures the coupling of the rod and of the cable, which means that the movement of the movable parts is free. In this case, it is impossible to determine the exact position of the movable parts and to adapt the thrust of the power plant. Consequently, this simplistic architecture does not allow for today's norms in terms of reliability of the control of the power plant thrust to be respected.

SUMMARY

The present invention aims at overcoming the drawbacks of the prior art.

To this end, the object of the invention is a device for controlling a variable section nozzle of an aircraft power plant, said variable section nozzle comprising one or several movable parts configured to modify the nozzle section and connected by a mechanical transmission chain to an actuator, said device comprising a system for regulating the power plant connected to a control member adapted to control the actuator, characterized in that the control device comprises a single control member, an immobilization unit configured to immobilize all the movable parts which are deactivated only when the regulation system controls the positional change of the movable part or parts, and a determination unit configured to determine the actual position of the movable part or parts.

This architecture allows for the onboard mass to be reduced and simplifies its integration and operation. In addition, the device obtained respects today's norms in terms of reliability of the control of the power plant thrust.

BRIEF DESCRIPTION OF DRAWINGS

Other characteristics and advantages will become apparent from the description that follows, the description being given only by way of non-limiting example, with reference to the drawings, wherein.

DETAILED DESCRIPTION OF EMBODIMENTS

Figure 1:
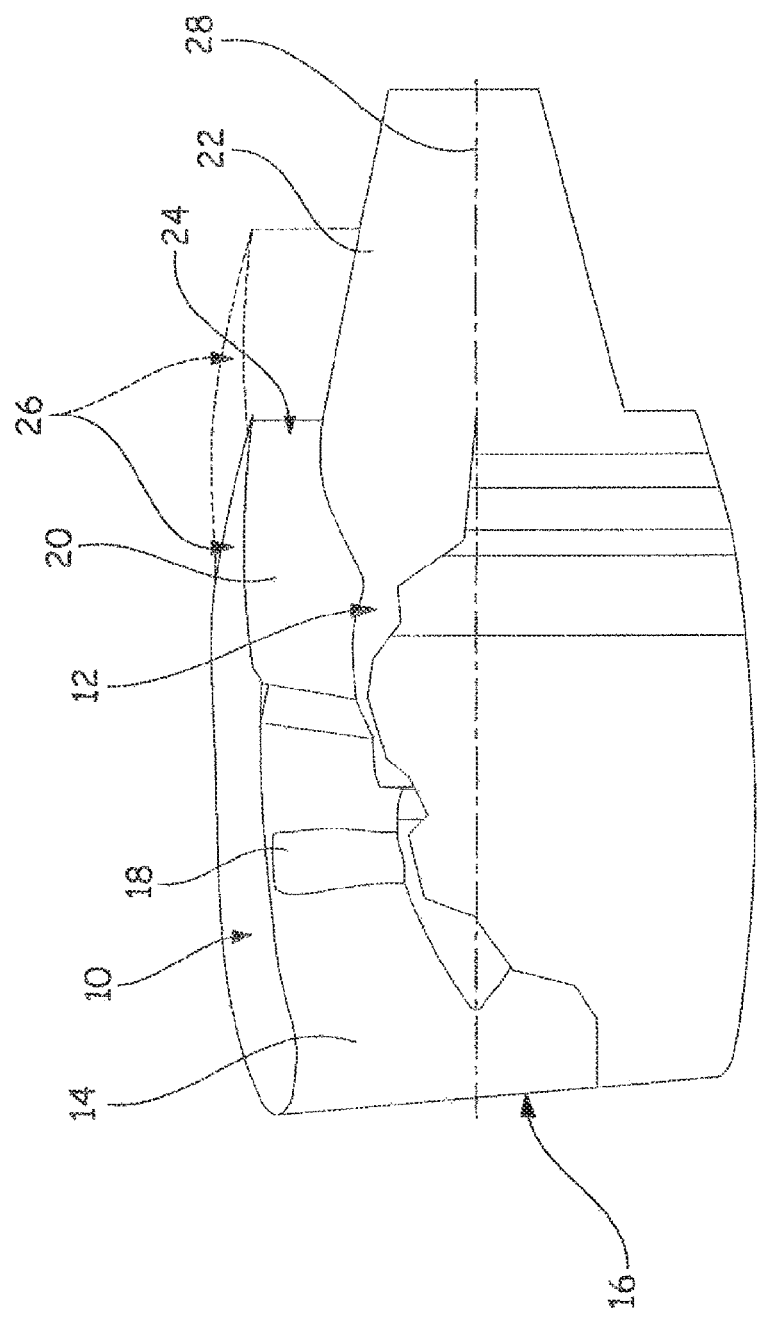
FIG. 1 is a lateral view of an aircraft propulsion system with partial cut-away for showing schematically a variable section nozzle.
Figure 2:
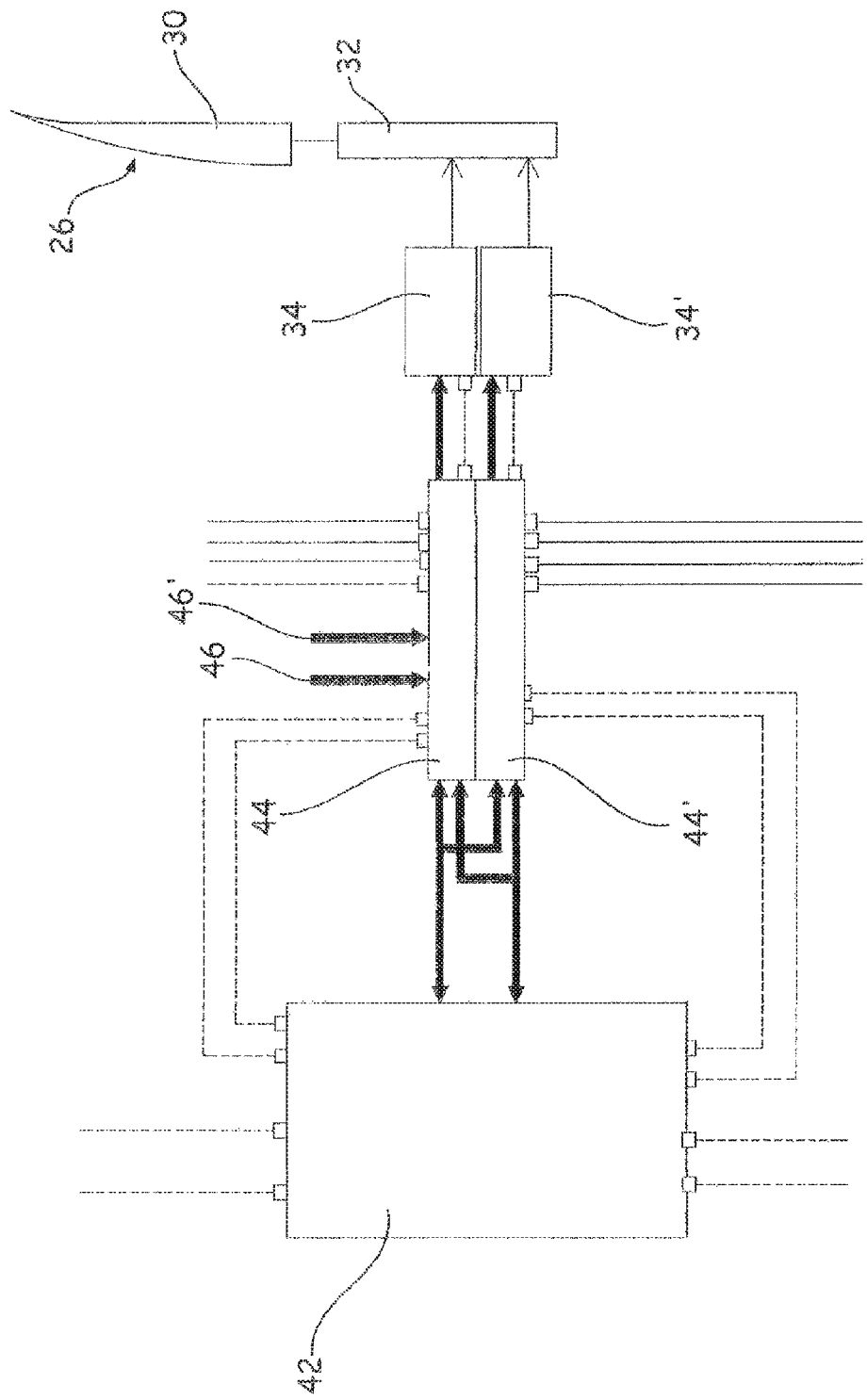
FIG. 2 is a schematic view of an architecture for controlling a variable section nozzle according to the prior art.
Figure 3:
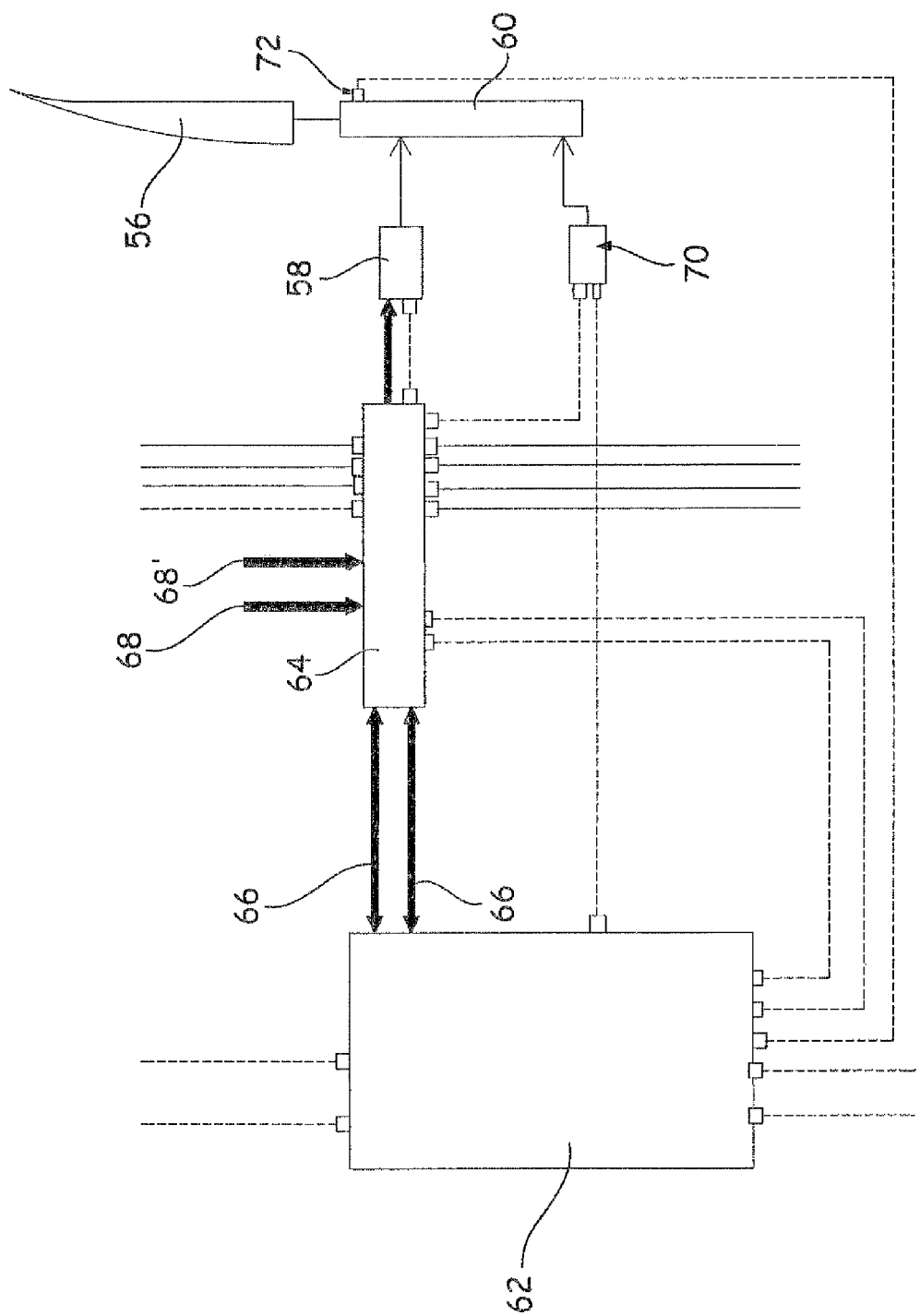
FIG. 3 is a schematic view of architecture for controlling a variable section nozzle according to the invention.

A variable section nozzle comprises at least one movable part 56 connected by means of a mechanical transmission chain 60 to an actuator 58 such as a motor, as shown schematically in FIG. 3.

The power plant, the variable section nozzle, the movable part or parts 56, the mechanical transmission chain and the actuator 58 are not described any further since they are known to one having ordinary skill in the art.

By way of example only, the variable section nozzle and the mechanical transmission chain can be identical to those described in document EP-779.429. However, the invention is not limited to this embodiment of the variable section nozzle, or to this mechanical transmission chain.

To ensure the control of the variable section nozzle, the aircraft comprises a system 62 for regulating the power plant also referred to as a FADEC and a control member 64 also referred to as a PE allowing for an actuator 58 to be controlled. As for the prior art, the control member 64 fulfills the function of converter between a control circuit upstream and a power circuit downstream.

According to the invention, for each variable section nozzle, the aircraft comprises a single control member 64. According to a first alternative, the aircraft comprises, for each variable section nozzle, a single actuator 58 adapted to move, by way of a power flow, all the movable parts of the variable section nozzle, said actuator being controlled by the single control member 64.

According to another alternative, the aircraft comprises, for each variable section nozzle, several actuators 58, each one of them being connected to movable parts via mechanical transmission chains, the assembly of actuators allowing for all the movable parts of a variable section nozzle to be displaced and being controlled by a single control member 64. Although the transmission chain is more complex in the case of a single actuator, this solution is preferable since it makes it possible to reduce the onboard mass and to simplify the operation and the integration.

According to an embodiment, an actuator 58 is in the form of an electric motor whose outlet shaft is connected to a first and of the mechanical transmission chain, the other end, or more precisely, the other ends of the latter being connected to a movable part.

The aircraft comprises, for each control member 64, two series of cables 66, 66' ensuring the transmission of the signals between the regulation system 62 and the control member 64 and two supplies 68, 68' of electric energy.

According to certification norms, the loss of control of the variable section of the nozzle is due either to the malfunction of the actuator 58 (or of one of the actuators), or to the malfunction of the control member 64 because of an electrical power failure or of an internal malfunction.

According to a characteristic of the method and control device of the invention, the aircraft comprises, for each variable section nozzle, an immobilization unit 70 for immobilizing all the movable parts 56 which are constantly activated and which are deactivated only when the regulation system 62 controls the positional change of the movable part or parts 56. Therefore, as long as the displacement of the movable parts 56 of a variable section nozzle is not controlled by the regulation system 62 (via the control member 64), the immobilization unit 70 block the movable part or parts 56.

The immobilization unit 70 is capable of occupying two states, a first activated state in which they interfere with the mechanical transmission chain and prevent any movement of the movable part or parts 56, and a second deactivated state in which they do not interfere with the mechanical transmission chain and allow the movement of the movable part or parts 56. Therefore, when the immobilization unit 70 is in the activated state, the variable section nozzle operates as a constant section nozzle, whereas when the immobilization unit 70 is in the deactivated state, it operates as a real variable section nozzle whose section can be adjusted.

Preferably, the immobilization unit comprises a body and a movable part capable of coining in contact with an element of the mechanical transmission chain in the activated state and spaced from said element of the mechanical transmission chain in the deactivated state, as well as a return unit (such as a spring, for example) adapted to maintain the movable part in the activated state, and an actuator adapted, in response to a signal, to maintain the movable part in the deactivated state against the return unit.

Therefore, in the idle state, in the absence of a signal, the immobilization unit is activated.

Among the solutions that can be envisioned to ensure the operation of the immobilization unit, the solution that is chosen must have a reliability of less than $10^{E-6}$.

To meet these criteria, the actuator of the immobilization unit is an electromagnet.

According to an embodiment, the immobilization unit 70 is in the form of a disc brake comprising, on the one hand, a hanger with two jaws which tighten an element of the transmission chain, and on the other hand, at least one spring for maintaining the jaws close together and at least one electromagnet which, when it is activated, moves the jaws apart against the spring.

Therefore, when no voltage runs through the electromagnet, it exerts no force, which means that the jaws, under the action of the spring, maintain the mechanical transmission chain immobilized.

According to a first alternative, the immobilization unit 70 is controlled by the control member 64 and a connection is provided between the immobilization unit 70 and the control member 64. This alternative is more particularly adapted when the actuator 58 is a continuous-current motor. In this case, when the control member 64 supplies the motor with current to displace the active part or parts 56, it also supplies, in parallel or in series, the electromagnet of the immobilization unit which subsequently switch to the deactivated state.

According to a first advantage, when the control member is defective because of an electrical power failure or of an internal malfunction, no signal is transmitted to the immobilizations unit 70 which remains in the activated state.

Alternatively, the immobilization unit 70 could be controlled by the regulation system 62 and a connection could be provided between the immobilization unit 70 and the regulation system 62. In this case, when the latter transmits an electrical signal to the control member to cause the movement of the movable part or parts 56, it transmits in parallel a signal to the immobilization unit to deactivate it.

Complementarily to the immobilization unit, the aircraft comprises, for each nozzle, a determination unit 72 for determining the actual position of the movable part or parts connected to the regulation system 62. Therefore, determination unit 72 is independent of the control member and actuator and can inform the regulation system 62, even in case of a malfunction of one of these elements.

Preferably, the determination unit 72 for determining the actual position of the movable part or parts comprise an angular incremental sensor of the type RVDT (Rotary Variable Differential Transformer).

This sensor can be installed in the area of the actuator, in the area of the mechanical transmission chain, or in the area of the movable part or parts.

In normal operation, before each configuration change, the determination unit 72 informs the regulation system 62 and indicate to the latter the actual position of the movable part or parts of the variable section nozzle.

Subsequently, the regulation system 62 transmits a signal to the control member 64 in order for the latter to bigger the rotation of the motor 58 at a certain angular value. In parallel, an order is transmitted to the immobilization unit 70 in order to deactivate it. Upon receipt of the signal, the control member 64 controls the rotation of the motor 58 according to the given angular value which itself causes, via the mechanical transmission chain, the movement of the movable part or parts of the variable section nozzle. This movement is made possible because the immobilization unit is deactivated. After a period of time, the immobilization unit is again activated. This period of time can be generated by delayed action.

Advantageously, the determination unit 72 indicates to the regulation system 62 the new actual position of the movable part or parts 56 of the variable section nozzle after each configuration change. This information feedback makes it possible to indicate to the regulation system 62 whether the control member and/or the actuator 58 are defective. Indeed, if the actual position detected by the determination unit 72 and transmitted to the regulation system 62, after the modification of the configuration of the variable section nozzle, do not correspond to the theoretical value calculated by the regulation system 62, then this indicates that one of the elements malfunctions.

Even under these circumstances, the control of the thrust is perfectly controlled because the immobilization unit 70 prevents the modification of the section which is maintained at a given value known by way of the determination unit 72 by the regulation system 62.

By way of example, three configurations are examined to show that the pilot is still capable of controlling the thrust of the motor in case the actuator and/or the control member malfunction(s).

The first case scenario is a blocking of the nozzle in the open position. In this case, the thrust is not adapted to the en-route phase. The increase of the motor rpm allows for the lack of thrust to be recovered in exchange for an overconsumption of fuel. If not enough thrust can be recovered, the cruising altitude is decreased. In this situation, it is estimated that the fuel overconsumption is on the order of 5%.

The second case scenario is a blocking in the closed position. In this situation, the nozzle has a configuration adapted to the en-route phase.

Insofar as, before take-off, the nozzle must be configured in the open position, if the pilot detects the blocking in the closed position during the verifications performed before take-off, he can either cancel the flight or manually force the open position with the help of a ground mechanic.

If this anomaly occurs during flight, in case of an overshoot, the motor power is decreased to avoid the risk of vibrations. However, the aircraft is sized so as to enable an overshoot with a single motor.

The last case scenario is a blocking in an intermediary position. The motor thrust is not adapted to the en-route phase, nor is it adapted to the take-off phase. However, the nozzle section is well-known to the regulation system 62 by way of the determination unit 72.

If this anomaly occurs before take-off, as previously, the pilot can either cancel the flight or manually force the open position with the help of a ground mechanic.

If the aircraft is in the en-route phase, the motor rpm is increased but less than in the case of a complete opening.

If the aircraft in the landing phase, the motor rpm is decreased to prevent vibrations, but less than in normal operation.

According to a method for controlling the thrust of an aircraft power plant according to the invention, the determination unit 72 indicates the actual position of the movable part or parts to the regulation system 62, and the regulation system 62 controls the thrust of the power plant by taking into account the actual position of the movable part or parts 56 of the variable section nozzle.

The invention claimed is:

1. A control device for controlling a variable section nozzle of an aircraft power plant, said variable section nozzle comprising one or several movable parts configured to modify the nozzle section and connected by a mechanical transmission chain to an actuator, said control device comprising:
a regulation system configured to regulate the aircraft power plant connected to a control member configured to control the actuator, characterized in that the control device comprises a single said control member, an immobilization unit configured to immobilize all the one or several movable parts which are deactivated only when the regulation system controls the positional change of the one or several movable parts, and a determination unit configured to determine the actual position of the one or several movable parts, wherein:
the immobilization unit is controlled by one of:
(i) the control member, with a connection being provided between the immobilization unit and the control member, and the control member simultaneously transmitting a signal to the actuator to displace the one or several movable parts and to the immobilization unit which subsequently switches to the deactivated state, whereby in an event that the control member is defective because of an electrical power failure or an internal malfunction, no signal is transmitted to the immobilization unit which remains in the activated state, and
(ii) the regulation system, with a connection being provided between the immobilization unit and the regulation system, wherein when the regulation system transmits an electrical signal to the control member to cause the movement of the one or more movable parts, the regulation system simultaneously transmits in parallel a signal to the immobilization unit to deactivate the immobilization unit.

2. The control device according to claim 1, characterized in that the determination unit that determines the actual position of the one or several movable parts is connected to the regulation system to indicate said actual position thereto.

3. The control device according to claim 1, characterized in that the immobilization unit comprises a body and a movable part configured to be in contact with an element of the mechanical transmission chain in the activated state and spaced from said element of the mechanical transmission chain in the deactivated state, as well as a return unit such as a spring configured to maintain the movable part in the activated state and an actuator configured, in response to a signal, to maintain the movable part in the deactivated state against the return unit.

4. The control device according to claim 1, characterized in that the determination unit that determines the actual position of the one or several movable parts comprises an angular incremental sensor of the type RVDT (Rotary Variable Differential Transformer).

5. A method for controlling a variable section nozzle of an aircraft power plant, said variable section nozzle comprising one or several movable parts configured to modify the nozzle section and connected by a mechanical transmission chain to an actuator, the aircraft comprising a regulation system for regulating the aircraft power plant connected to a control member configured to control the actuator, the method comprising:
using a single said control member, an immobilization unit configured to immobilize all the one or several movable parts, and a determination unit configured to determine the actual position of the one or several movable parts and deactivating said immobilization unit only when the regulation system controls the positional change of the one or several movable parts,
controlling the immobilization unit by one of:
(i) the control member, a connection being provided between the immobilization unit and the control member, and simultaneously transmitting by the control member a signal to the actuator to displace the one or several movable parts and to the immobilization unit which subsequently switches to the deactivated state, whereby in an event that the control member is defective because of an electrical power failure or an internal malfunction, no signal is transmitted to the immobilization unit which remains in the activated state, and
(ii) the regulation system, with a connection being provided between the immobilization unit and the regulation system, wherein when the regulation system transmits an electrical signal to the control member to cause the movement of the one or more movable parts, the regulation system simultaneously transmits in parallel a signal to the immobilization unit to deactivate the immobilization unit.

6. The control method according to claim 5, characterized in that the determination unit that determines the actual position of the one or several movable parts informs the regulation system by indicating thereto the actual position of one or several movable parts of the variable section nozzle before each configuration change.

7. The control method according to claim 5, characterized in that the determination unit that determines the actual position of the one or several movable parts informs the regulation system by indicating thereto the actual position of the one or several movable parts of the variable section nozzle after each configuration change.

8. A control method for controlling the thrust of an aircraft power plant equipped with a variable section nozzle, said variable section nozzle comprising one or several movable parts configured to modify the nozzle section and connected by a mechanical transmission chain to an actuator, the aircraft comprising a regulation system for regulating the aircraft power plant connected to a control member configured to control the actuator, the method comprising:
(a) using a single said control member, an immobilization unit configured to immobilize all the one or several movable parts deactivated only when the regulation system controls the positional change of the one or several movable parts and a determination unit configured to determine the actual position of the one or several movable parts, the determination unit indicating, to the regulation system, the actual position of the one or several movable parts, wherein:
the immobilization unit is controlled by one of:
(i) the control member, with a connection being provided between the immobilization unit and the control member, and simultaneously transmitting by the control member a signal to the actuator to displace the one or several movable parts and to the immobilization unit which subsequently switches to the deactivated state, whereby in an event that the control member is defective because of an electrical power failure or an internal malfunction, no signal is transmitted to the immobilizations unit which remains in the activated state, and
(ii) the regulation system, with a connection being provided between the immobilization unit and the regulation system, wherein when the regulation system transmits an electrical signal to the control member to cause the movement of the one or more movable parts, the regulation system simultaneously transmits in parallel a signal to the immobilization unit to deactivate the immobilization unit, and
(b) controlling by the regulation system the thrust of the power plant by taking into account the actual position of the one or several movable parts of the variable section nozzle.

* * * * *